US008798172B2

(12) United States Patent
Oh et al.

(10) Patent No.: US 8,798,172 B2
(45) **Date of Patent: *Aug. 5, 2014**

(54) METHOD AND APPARATUS TO CONCEAL ERROR IN DECODED AUDIO SIGNAL

(75) Inventors: Eun-mi Oh, Seongnam-si (KR); Ho-sang Sung, Yongin-si (KR); Chang-yong Son, Gunpo-si (KR); Ki-hyun Choo, Seoul (KR); Jung-hoe Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1152 days.

This patent is subject to a terminal disclaimer.

(21) Appl. No.: 11/749,249

(22) Filed: May 16, 2007

(65) Prior Publication Data

US 2007/0271480 A1 Nov. 22, 2007

Related U.S. Application Data

(60) Provisional application No. 60/747,324, filed on May 16, 2006.

(30) Foreign Application Priority Data

May 30, 2006 (KR) ........................ 10-2006-0049040

(51) Int. Cl.
*H04N 7/12* (2006.01)
*G06F 11/00* (2006.01)

(52) U.S. Cl.
USPC .................... 375/240.27; 375/240.26; 714/48

(58) Field of Classification Search
USPC ........................................ 375/240.27; 714/48
See application file for complete search history.

(56) References Cited

U.S. PATENT DOCUMENTS 4,716,565 A * 12/1987 Suma ............................ 714/747
4,868,828 A * 9/1989 Shao et al. .................... 714/704
5,359,469 A * 10/1994 Ueda .............................. 360/53
5,473,727 A * 12/1995 Nishiguchi et al. ........... 704/222
5,570,199 A * 10/1996 Tanaka et al. ................ 386/239
5,926,489 A * 7/1999 Luthi et al. .................... 375/346
6,597,961 B1 * 7/2003 Cooke ............................. 700/94
6,636,565 B1 * 10/2003 Kim ......................... 375/240.27
6,917,648 B1 * 7/2005 Morimatsu et al. ...... 375/240.01
6,959,020 B1 * 10/2005 Hourunranta et al. ........ 370/542
7,356,748 B2 * 4/2008 Taleb ............................ 714/746
7,447,639 B2 * 11/2008 Wang ............................ 704/503
7,519,535 B2 * 4/2009 Spindola ....................... 704/266
7,702,406 B2 * 4/2010 Hatanaka et al. ............... 700/94
2003/0053454 A1 * 3/2003 Katsavounidis et al. ..... 370/389
2003/0086504 A1 * 5/2003 Magee et al. ................ 375/262

(Continued)

OTHER PUBLICATIONS

Labeau et al, May 2002, IEEE, vol. 11, No. 5, pp. 518-529.*

(Continued)

*Primary Examiner* — Luu Pham
*Assistant Examiner* — Jenise Jackson
(74) *Attorney, Agent, or Firm* — Stanzione & Kim, LLP

(57) ABSTRACT

A method and apparatus to decode audio data constructed with a plurality of layers. An error concealment method of process a decoded bitstream selects one of a frequency domain and a time domain in order to conceal the errors, detects a position where the errors exist in a frame when the error concealment method in the frequency domain is selected, and conceals the errors only in a segment after the detected position.

43 Claims, 5 Drawing Sheets

(56) References Cited

U.S. PATENT DOCUMENTS

| | | | | |
|---|---|---|---|---|
| 2003/0193727 | A1* | 10/2003 | Fioravanti et al. | 360/31 |
| 2004/0039464 | A1* | 2/2004 | Virolainen et al. | 700/94 |
| 2004/0083110 | A1* | 4/2004 | Wang | 704/500 |
| 2004/0128128 | A1* | 7/2004 | Wang et al. | 704/229 |
| 2004/0139462 | A1* | 7/2004 | Hannuksela et al. | 725/32 |
| 2004/0250195 | A1* | 12/2004 | Toriumi | 714/758 |
| 2005/0002652 | A1* | 1/2005 | Hartung et al. | 386/114 |
| 2005/0157799 | A1* | 7/2005 | Raman et al. | 375/240.27 |
| 2005/0259735 | A1* | 11/2005 | Zhu | 375/240.16 |
| 2005/0268205 | A1* | 12/2005 | Rhee et al. | 714/758 |
| 2006/0039475 | A1* | 2/2006 | Liu et al. | 375/240.16 |
| 2006/0146940 | A1* | 7/2006 | Gomila et al. | 375/240.27 |
| 2007/0198254 | A1* | 8/2007 | Goto et al. | 704/226 |
| 2009/0225832 | A1* | 9/2009 | Gomila et al. | 375/240.12 |

OTHER PUBLICATIONS

Korean Office Action Issued on Feb. 28, 2012 in KR Patent Application No. 10- 2006-0049040.

* cited by examiner

METHOD AND APPARATUS TO CONCEAL ERROR IN DECODED AUDIO SIGNAL

CROSS-REFERENCE TO RELATED APPLICATIONS

This application claims the benefit of U.S. Provisional Patent Application No. 60/747,324, filed on May 16, 2006, in the U.S. Patent trademark Office, and the benefit of Korean Patent Application No. 10-2006-0049040, filed on May 30, 2006, in the Korean Intellectual Property Office, the disclosures of which are incorporated herein in their entirety by reference.

BACKGROUND OF THE INVENTION

1. Field of the Invention

The present general inventive concept relates to an apparatus to decode audio data constructed with a plurality of layers such as bit-sliced arithmetic coding (BSAC), and more particularly, to a method and apparatus to conceal an error in a decoded bitstream.

2. Description of the Related Art

In the process of transmitting an encoded audio signal through a wired/wireless network such as a terrestrial-digital multimedia broadcasting (T-DMB) or an Internet protocol (IP) network, errors occur. In this case, if the errors are not properly treated, decoding cannot be correctly performed due to a transmission error, and sound quality significantly deteriorates.

Conventionally, in order to conceal the errors of an audio signal, a muting method of reducing an influence of the errors on an output by reducing a sound volume of a frame having the errors, a repetition method of copying data of a previous frame to a frame having errors, and a method of restoring a time domain sample of a frame having errors by using a previous frame by performing interpolation or extrapolation, are used.

However, in general, in order to conceal errors existing in the audio signal, the whole data corresponding to a unit frame including errors is restored by using another frame instead of restoring only a part where errors occur. Therefore, there is a problem in terms of deterioration in output sound quality.

SUMMARY OF THE INVENTION

The present general inventive concept provides a method and apparatus to decode a signal and conceal one or more errors in a decoded signal, thereby preventing deterioration of a quality of the decoded signal.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an error concealment method and apparatus to conceal one or more errors in a decoded audio signal by selecting one of a frequency domain and a time domain to conceal errors, detecting a position where the errors exist from a frame when the error concealment in the frequency domain is selected, and concealing the errors only in a segment after the detected position.

The selecting of the one of the error concealment methods on the predetermined basis may include determining whether concealing the errors in the frequency domain for the frame is difficult, and selecting the one of the error concealment method in the frequency domain and the error concealment method in the time domain according to the result of the determining.

The determining of whether concealing the errors in the frequency domain for the frame is difficult may include determining on a basis of a window type.

The selecting of the one error concealment method on a predetermined basis may further include detecting a position where the errors exist in the frame, and selecting the one of the error concealment method in the frequency domain and the error concealment method in the time domain by using the detected position.

The detecting of the position may include detecting the position only when the error concealment method in the frequency domain is selected according to the result of the determining.

The detecting of the position where the errors exist in the frame may include comparing spectrum energy of the frame and spectrum energy of a previous frame.

The detecting of the position where the errors exist in the frame may include comparing spectrum energy of the frequency domain and spectrum energy of a previous frequency domain.

The detecting of the position where the errors exist may include detecting a layer of the frame having the error by examining bits allocated to each layer of the decoded bitstream.

The selecting of the one error concealment method according to the detected position may include selecting the error concealment method in the time domain when the detected position is provided before a critical position.

The selecting of the one error concealment method according to the detected position may include selecting the one error concealment method in the frequency domain when the detected position is included in a predetermined range.

The selecting of the one error concealment method according to the detected position may include not concealing the error when the detected position is provided after a critical position.

The concealing of the error when the error concealment method in the frequency domain is selected may include restoring a frequency band corresponding to the detected position of the frame with a signal corresponding to a frequency band of a previous frame.

The concealing of the error when the error concealment method in the frequency domain is selected may include restoring a layer including the detected position and next layers of the layer with layers of a previous frame.

The concealing of the error when the error concealment method in the time domain is selected may include concealing the errors by using interpolation or extrapolation.

The concealing of the errors when the error concealment method in the time domain is selected may include concealing the errors in the frame and a next frame.

The concealing of the errors in the frame may include concealing the errors by a WSOLA (waveform similarity based overlap-add) method, and concealing errors in a next frame by interpolation.

The determining of whether the errors exist in the frame of the decoded bitstream may include comparing a length of a transmitted bitstream with a length of the decoded bitstream.

The foregoing and/or other aspects and utilities of the present general inventive concept may also be achieved by providing error concealment method of processing a decoded audio signal, the method including selecting on a predetermined basis one of an error concealment method in a frequency domain and an error concealment method in a time domain for a frame of a decoded bitstream having one or more errors, and concealing the errors according to the selected method.

The foregoing and/or other aspects and utilities of the present general inventive concept may also be achieved by providing computer-readable medium having embodied thereon a computer program to execute a method of processing a decoded audio signal, the method including determining whether one or more errors exist in a frame of a decoded bitstream, when it is determined that the errors exist in the frame, selecting one of an error concealment method in a frequency domain and an error concealment method in a time domain on a predetermined basis, and concealing the errors according to the selected method.

The foregoing and/or other aspects and utilities of the present general inventive concept may also be achieved by providing error concealment apparatus to process a decoded audio signal, the apparatus including an error frame detector to detect a frame of a decoded bitstream having one or more errors, a concealment method selector to select on a predetermined basis one of an error concealment method in a frequency domain and an error concealment method in a time domain for the detected frame, and an error concealment unit to conceal the errors according to the selected method.

The concealment method selector may include a determiner to determine whether concealing the errors in the frequency domain for the frame is difficult; and a first selector to select the one of the error concealment method in the frequency domain and the error concealment method in the time domain according to the result of the determining.

The determiner may determine whether concealing the errors in the frequency domain for the frame is difficult on a basis of a window type.

The concealment method selector may further include an error position detector to detect a position where the errors exist in the frame, and a second selector to select the one of the error concealment method in the frequency domain and the error concealment method in the time domain by using the detected position.

The error position detector may detect the position where the errors exist in the frame only when the first selector selects the error concealment method in the frequency domain.

The error position detector may detect the position where the errors exist in the frame by comparing spectrum energy of the frame with spectrum energy of a previous frame.

The error position detector may detect the position where the errors exist in the frame by comparing spectrum energy in the frequency domain with spectrum energy of a previous frequency domain.

The error position detector may detect the position where the errors exist in the frame by examining bits allocated to each layer of the decoded bitstream.

The second selector may select the error concealment method in the time domain when the detected position is provided before a critical position of the frame.

The second selector may select the error concealment method in the frequency domain when the detected position is included in a predetermined range.

The second selector may not conceal the errors of the decoded bitstream when the detected position is provided after a critical position.

The error concealment unit may restore a frequency band corresponding to the detected position with a signal corresponding to a frequency band of a previous frame when the error concealment method in the frequency domain is selected.

The error concealment unit may restore a layer corresponding to the detected position and next layers with layers of a previous frame when the error concealment method in the frequency domain is selected.

The error concealment unit may conceal the errors by using interpolation or extrapolation when the error concealment method in the time domain is selected.

The error concealment unit may conceal the errors for the frame and a next frame when the error concealment method in the time domain is selected.

The error concealment method may conceal the errors for the frame by using a WSOLA method and conceals errors for the next frame by using interpolation.

The error frame detector may detect the frame of the decoded bitstream having the errors by comparing a length of a transmitted bitstream with a length of the decoded bitstream.

The foregoing and/or other aspects and utilities of the present general inventive concept may also be achieved by providing an error concealment apparatus to process a decoded audio signal, the apparatus including a concealment method selector to select on a predetermined basis one of an error concealment method in a frequency domain and an error concealment method in a time domain for a frame of a decoded bitstream having one or more errors, and an error concealment unit to conceal the errors according to the selected method.

The foregoing and/or other aspects and utilities of the present general inventive concept may also be achieved by providing an audio processing apparatus to process an audio signal, including a decoder to decode a bitstream, and an error concealment apparatus to select one of an error concealment method in a frequency domain and an error concealment method in a time domain for the detected frame when a frame of the decoded bitstream includes one or more errors, and to conceal the errors according to the selected error concealment method.

The foregoing and/or other aspects and utilities of the present general inventive concept may also be achieved by providing an audio processing apparatus to process an audio signal, including a decoder to decode an audio signal to generate a decoded signal having a plurality of frames, and an error concealment apparatus to conceal one or more errors of one of the plurality of frames according to a location within the one frame and an error concealment method in a frequency domain.

The foregoing and/or other aspects and utilities of the present general inventive concept may also be achieved by providing an audio processing apparatus to process an audio signal, including a decoder to decode an audio signal to generate a decoded signal having a plurality of frames and a plurality of layers, and an error concealment apparatus to conceal one or more errors of one of the plurality of frames according to a combination of a state of the frame having the errors, a state of one of the layers having the errors, and an error concealment method in a frequency domain.

The foregoing and/or other aspects and utilities of the present general inventive concept may also be achieved by providing an audio processing apparatus to process an audio signal, including a decoder to decode an audio signal to generate a decoded signal, an error concealment apparatus to selectively conceal one or more errors of decoded signal according to a location of the errors and one of a concealment method in a time domain and a concealment method in a frequency domain, and an inverter to inversely transform the decoded audio signal received from the error concealment apparatus.

The foregoing and/or other aspects and utilities of the present general inventive concept may also be achieved by providing an error concealment apparatus to process an audio signal, including a concealment unit to selectively conceal one or more errors of an audio signal according to a characteristic of a layer of a frame having the errors in the audio signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
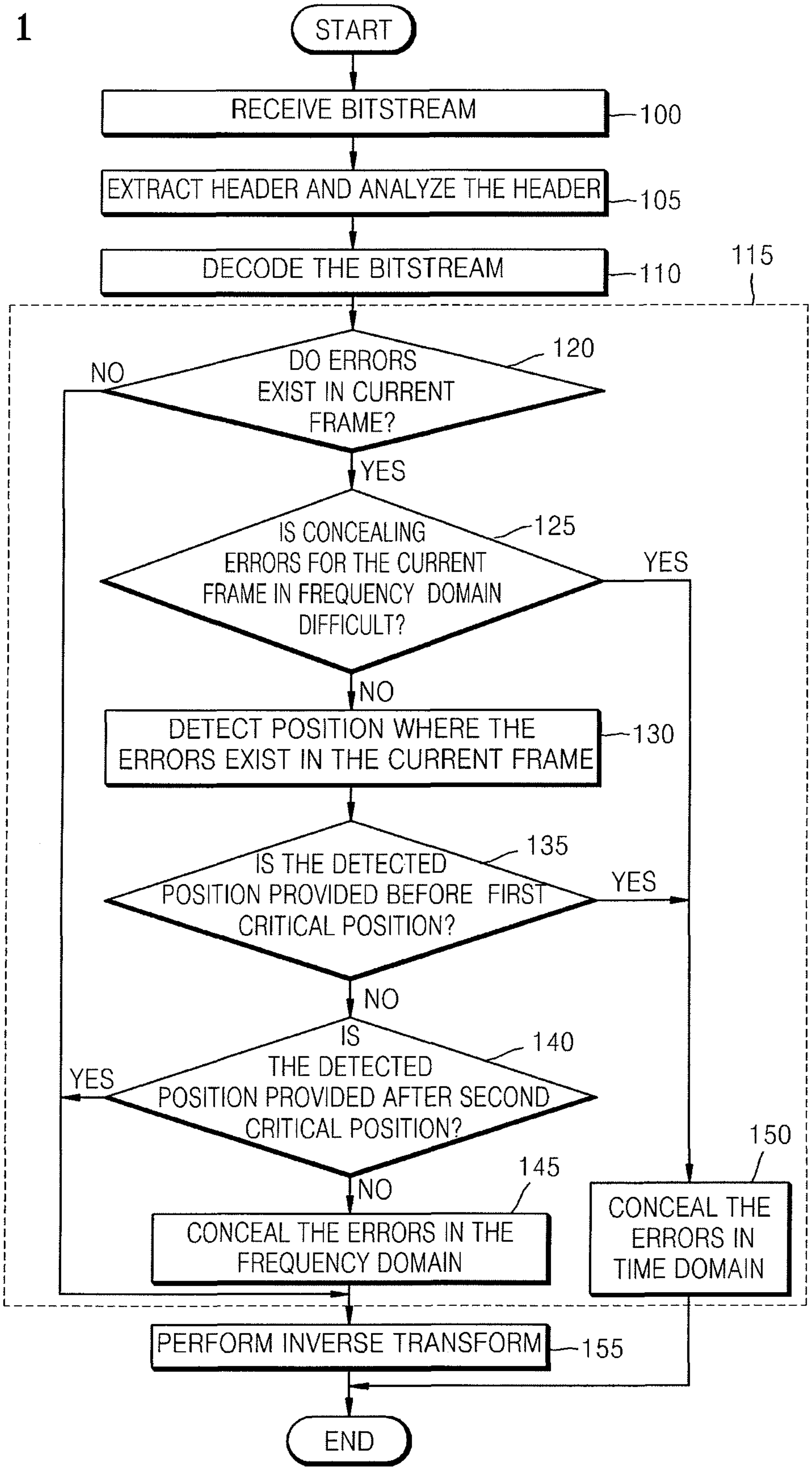
FIG. 1 is a flowchart illustrating a method of decoding an audio signal using an error concealment method according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a method of decoding an audio signal using an error concealment method according to an embodiment of the present general inventive concept.

First, a bitstream is input from an upper level system such as a Moving Picture Experts Group-4 (MPEG-4) system or a Moving Picture Experts Group-Transport Stream (MPEG-TS) (operation 100).

A header is extracted from the bitstream input, and information included in the header is analyzed (operation 105).

After operation 105, the bitstream input in operation 100 is decoded (operation 110).

One or more errors existing in the bitstream decoded in operation 110 are concealed (operation 115). Operation 115 refers to the error concealment method for a decoded audio signal according to the current embodiment It is determined whether the errors exist in a current frame of the bitstream decoded in operation 110 (operation 120).

Whether the errors exist in the current frame may be determined by using one of the three following methods in operation 120.

First, whether errors exist in the current frame is determined by performing a cyclic redundancy checking (CRC) operation using information which is transmitted from a system to show whether errors exist in a frame. The system may include an encoder and/or decoder to encode data into a bit stream and/or decode the bitstream, and may also include transmitting and receiving devices connected between the encoder and the decoder through a wired or wireless network.

Second, whether errors exist in the current frame is determined by comparing a length of a bitstream transmitted from an encoder and a length of the bitstream decoded in operation 110. When errors exist in the frame, a difference occurs between the length of the decoded bitstream and the length of the bitstream transmitted from the encoder. On the other hand, when errors do not exist in the frame, the length of the bitstream transmitted from the encoder is used for decoding. In bit-sliced arithmetic coding (BSAC) using arithmetic decoding, additional bits of 32 bits or less can be decoded due to characteristics of the arithmetic decoding. Therefore, when the length of the bitstream transmitted from the encoder and the length of the decoded bitstream are the same, it is determined that errors do not exist in the bitstream of the current frame. In the BSAC, a bit difference between the bitstreams is 32-bit or less, it is determined that errors do not exist. When the length of the bitstream transmitted from the encoder and the length of the decoded bitstream are different, it is determined that errors exist in the bitstream of the current frame.

Last, whether errors exist in the current frame is determined by comparing the number of bits of a unit frame included in a header of a bitstream with the number of bits of the bitstream input in operation 100. For example, in the BSAC, frame_length information representing a length of the unit frame provided to the header is compared with the number of bits of the bitstream input in operation 100. When the result of the comparing shows that a difference of a predetermined critical value or more occurs, it is determined that errors exist in the current frame.

If it is determined that errors exist in the current frame in operation 120, whether concealing the errors in a frequency domain is difficult is determined by analyzing a state of the current frame (operation 125). Whether concealing the errors in the frequency domain in a codec using a bitstream including a plurality of layers in the BSAC or advanced audio coding (AAC) is difficult can be determined on the basis of a window type. Due to characteristics of modified discrete cosine transformation (MDCT) applied to encoding and decoding processes, when window types of a previous frame and the current frame are different from each other, and an overlap and add operation is not performed on the previous and current frames when errors do not exist, a desired audio signal cannot be generated. Thus, whether concealing the errors in the frequency domain is difficult is determined by analyzing the state of the current frame and considering a state of the previous frame in operation 125. For example, if the states (or window types) of the current and previous frames are different, it can be determined to be difficult to conceal the errors in the frequency domain. However, the present general inventive concept is not limited thereto. Other characteristics of the current and previous frames can be used to determine the difficulty in concealing the error from the decoded audio signal.

If it is determined in operation 125 that concealing the errors in the frequency domain in the current frame is not difficult, a position where the errors exist is detected in the current frame (operation 130).

Examples of methods of detecting the position where the errors exist in the current frame in operation 130 include the following two methods.

Figure 4A:
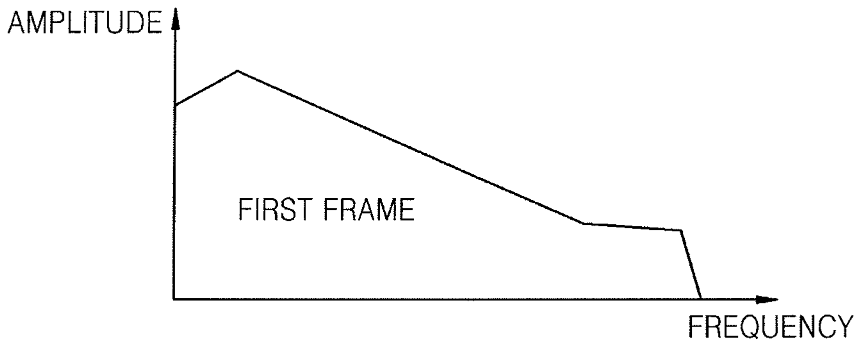
FIG. 4A is a graph illustrating spectrum energy of a previous frame where errors do not exist.
Figure 4B:
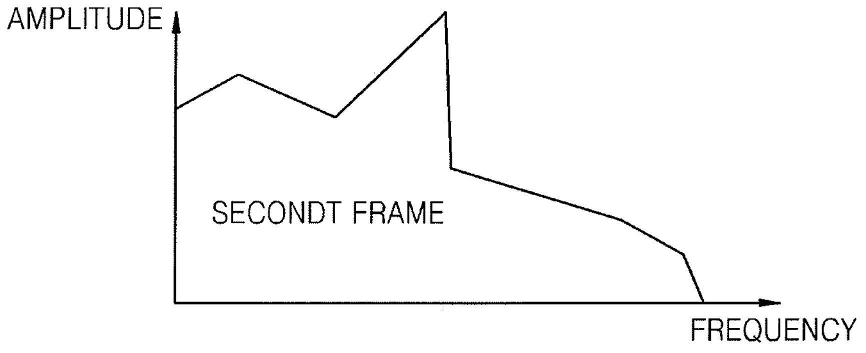
FIG. 4B is a graph illustrating spectrum energy of a current frame where errors exist.

First, the position where the errors exist in the current frame is detected by comparing spectrum energy (or amplitude with respect to frequencies) of the current frame with spectrum energy (or amplitude with respect to frequencies) of the previous frame. When errors exist in a frame, the spectrum energy of the current frame significantly changes as compared with the spectrum energy of the previous frame. For example, FIG. 4A is a graph illustrating the spectrum energy of the previous frame where errors do not exist, and FIG. 4B is a graph illustrating the spectrum energy of the current frame where errors exist. When the graphs illustrated in FIGS. 4A and 4B are compared, it can be seen that the spectrum energy in the frequency domain where errors exist significantly changes. Here, by using Equation 1 below, the spectrum energy of the current frame and the spectrum energy of the previous frame can be compared with each other.

$$Dt(f)=\text{energy}(f,t)-\text{energy}(f,t-1) \quad \text{[Equation 1]}$$

Here, Dt(f) denotes a change in a spectrum energy of a frame, energy(f, t) denotes the spectrum energy of the current frame, and energy(f, t−1) denotes the spectrum energy of the previous frame.

When Dt(f) deviates from a predetermined range, it is determined that errors exist at a corresponding position.

In addition, the position where errors exist in the current frame can be detected by comparing spectrum energy in a current frequency domain and a spectrum energy in a previous frequency domain. When errors exist in a frame, the spectrum energy in the current frequency domain significantly changes as compared with the spectrum energy in the previous frequency domain. By using Equation 2 below, the spectrum energy in the current frequency domain and the spectrum energy in the previous frequency domain can be compared with each other.

$$Df(f)=\text{energy}(f,t)-\text{energy}(f-1,t) \quad \text{[Equation 2]}$$

Here, Df(f) denotes a change in a spectrum energy in the frequency domain, energy(f, t) denotes the spectrum energy in the current frequency domain, and energy(f, t−1) denotes the spectrum energy in the previous frequency domain.

When Df(f) deviates from a predetermined range, it is determined that errors exist at a corresponding position.

By using the aforementioned method, a layer corresponding to a frequency band where errors occur is deduced.

Second, the position where the errors exist in the current frame is detected by examining bits allocated to each layer of the decoded bitstream. A header of a bitstream constructed with a plurality of layers has information on the number of bits to be allocated to each layer. For example, in the BSAC, a header includes layer_buf_offset that is a help variable and shows the number of bits to be allocated to each layer. When errors exist in a layer, more or less bits (this is extremely vague—can mean any number of bits) are used in the arithmetic decoding. Therefore, a layer using more or less bits may have a possibility that errors exist in the current layer or a previous layer.

Figure 3:
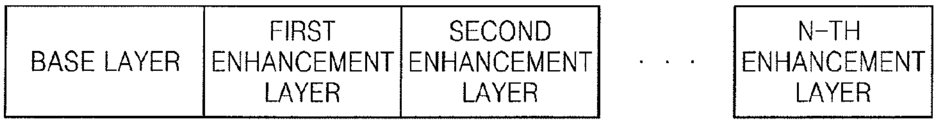
FIG. 3 is a conceptual view illustrating a structure of a bitstream constructed with a plurality of layers in bit-sliced arithmetic coding (BSAC)

Whether the position detected in operation 130 is provided before a first critical position is determined (operation 135). When the position detected in operation 130 corresponds to data which has an important role in decoding such as the base layer shown in FIG. 3, it is possible to perform concealing errors for the entire frame in the time domain as illustrated in FIG. 1. However, errors can be corrected by using an error concealment method for the entire frequency domain of a frame in the frequency domain. Here, the first critical position may be a position in the base layer of the bitstream.

If it is determined in operation 135 that the detected position is provided after the first critical position, it is determined that the position detected in operation 130 is provided after a second critical position (operation 140). When the position detected in operation 130 is in the last layer corresponding to an N-th enhancement layer in FIG. 3 and therefore errors do not substantially affect audio sound quality, the errors need not be concealed. Here, the second critical position may be a position in the last layer of the bitstream.

If it is determined in operation 140 that the detected position is provided before the second critical position, errors in the current frame are concealed in the frequency domain (operation 145). In operation 145, in order to conceal the errors, a repetition method of copying data of the previous frame to a frame having the errors is used. Data before the position detected in operation 130 remains, and data after the position detected in operation 130 is restored by copying the data of the previous frame as the data after the position. Accordingly, when the bitstream is constructed with a plurality of layers and a frequency band is allocated to each layer such as in the BSAC, layers before a layer having the errors can be maintained as they are, although errors occur in the middle of the bitstream. For example, when the position detected in operation 130 is 8 kHz, a layer corresponding to the 8 kHz and layers after the corresponding layer are restored by copying layers of a previous frame thereto. Accordingly, by using information decoded before the occurrence of errors for a frame having the errors, the audio sound quality can be improved.

If it is determined in operation 125 that concealing errors in the frequency domain for the current frame is difficult and if it is determined in operation 135 that the detected position is provided before the first critical position, errors are concealed in the time domain for the current frame (operation 150).

In order to conceal the errors in operation 150, information on the current frame is ignored, and a segment having the highest similarity to the current frame having the error is retrieved from a previous frame so as to restore the current frame by using interpolation or extrapolation. When the MDCT is applied to generate the bitstream, and the overlap and add operation is performed on a decoded signal of the bitstream, two pulse code modulation (PCM) frames are lost due to the characteristics of the MDCT and the overlap and add operation.

Figure 5:
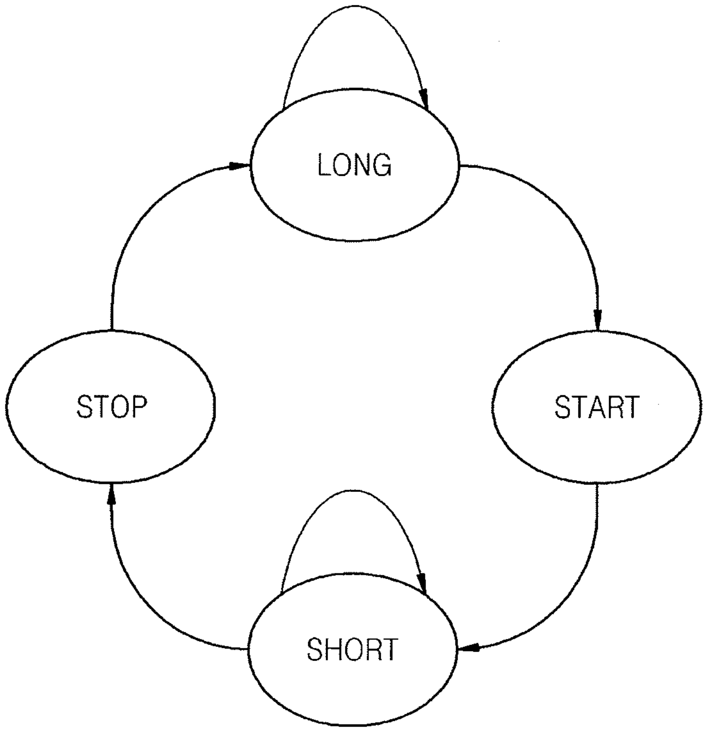
FIG. 5 is a view illustrating transition using an error concealment method a the time domain.

Accordingly, when errors occur in a frame, two frames including the frame need to be restored. Therefore, in operation 150, not only the current frame but also a next frame has to be restored by using interpolation or extrapolation. In order to do this, information on previous frames is stored and used to conceal the errors in the current frame. FIG. 5 is a view illustrating transition using an error concealment method in the time domain. In addition, a synchronous overlap and add operation of restoring two continuous PCM frames may be used. For example, stop, long, start, and short operations are performed as the synchronous overlap and add operation to restore the continuous PCM frames.

Figure 6:
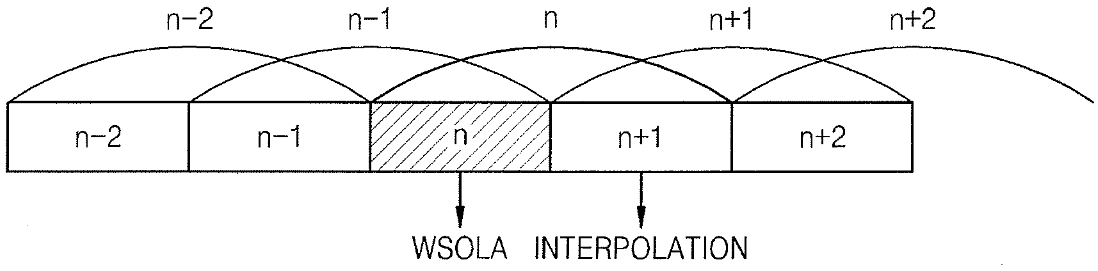
FIG. 6 is a view illustrating a method of correcting errors by using a waveform similarity based overlap-add (WSOLA) method and frame interpolation in a time domain.

Referring to FIG. 6, when errors occur in an n-th frame corresponding to the current frame, due to a predetermined overlap window, for example, a 50% overlap window, an (n+1)-th frame corresponding to the next frame is affected. When a previous signal is simply repeatedly used, the previous frame, a first error frame, and a second error frame sequentially generate errors, so that there is a problem in that sound quality significantly deteriorates. In order to solve the problem of generating sequential errors, a waveform similarity overlap add algorithm (or WSOLA method) and interpolation may be simultaneously used. The n-th frame corresponding to the first frame may be applied with the WSOLA method, and the (n+1)-th frame corresponding to the second frame may be applied with the frame interpolation.

Figure 7:
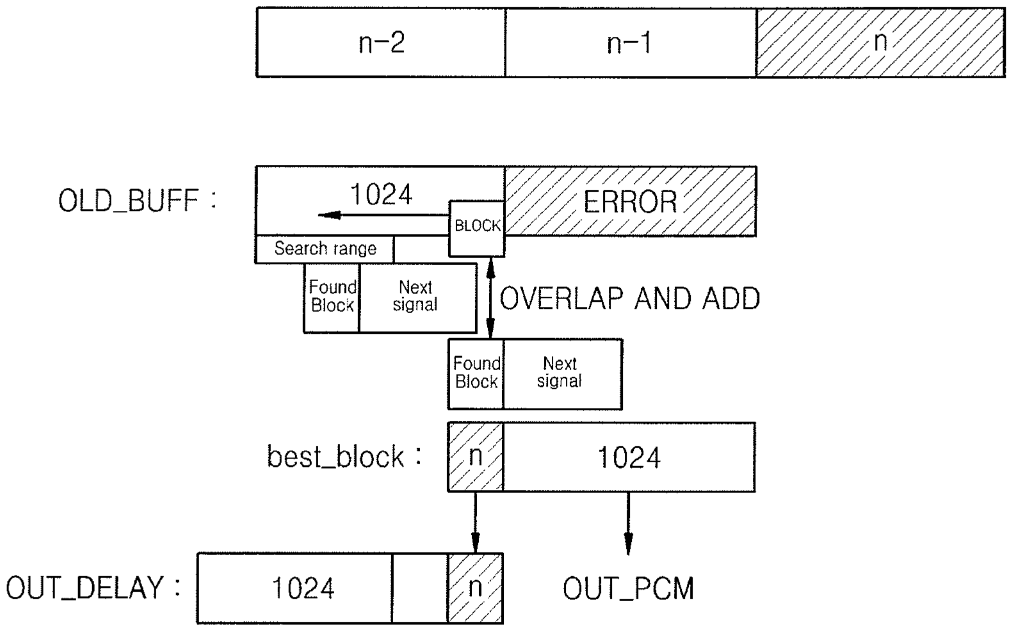
FIG. 7 is a view illustrating a WSOLA method applied to an n-th frame of a first frame.

An embodiment to apply the WSOLA method to the n-th frame corresponding to the first frame is illustrated in FIG. 7. First, an output of a previous time domain of the BSAC is buffered. By using the previous block signal of the current frame generating errors and the following Equation 3 in a previous search range, a correlation is obtained.

$$R(d) = \frac{\sum_{k=0}^{K} S(k)S(k-d)}{\sqrt{\sum_{k=0}^{K} S^2(k) \sum_{k=0}^{K} S^2(k-d)}} \quad \text{[Equation 3]}$$

Here, R(d) denotes the correlation, s(n) denotes an old_buff signal, and d denotes a sample position in the search range.

After obtaining a position of a found block having the highest correlation from among correlations obtained by using Equation 3, the found block and a next signal are copied to a segment generating errors so as to restore the segment. Here, when the copying and restoring are performed, windowing is performed. A segment of the found block on which the overlapping is performed may use one of a linear function, a polynomial function, and a sine function, and a segment of the found block on which the overlapping is not performed may use a rectangular window. In addition, a window having a phase opposite to the window used in the found block is obtained for a block segment to overlap and be added to the segment of the found block. Here, the windows are designed so that a sum of the two window values in the overlapped segment is 1. The aforementioned operations are repeatedly performed to the end of the frame. Here, according to the size of the frame, the frame can be divided in units of 1 or more. According to Equation 3, the correlations are obtained in units of a sample. In this case, in consideration of complexity, the correlations can be obtained in units of two or more samples.

In addition, in order to increase precision in obtaining the correlation, around a sample having the highest correlation and in a range of two or more samples, correlations may be additionally obtained in units of a sample to obtain a position of the sample having the highest correlation.

Figure 8:
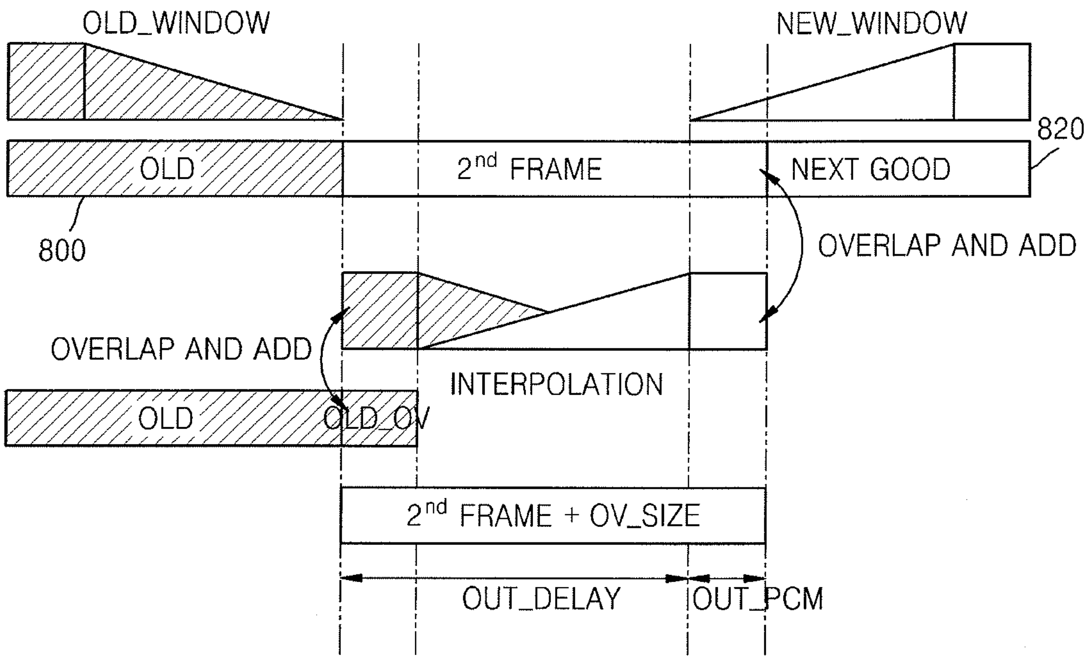
FIG. 8 is a view illustrating frame interpolation applied to a second frame.

An embodiment to apply frame interpolation to the (n+1)-th frame corresponding to the second frame is illustrated in FIG. 8. Linear interpolation is applied between an old frame 800 and a next good frame 820. Since a future signal is provided in units of a frame due to a delay problem, a window is modified and applied with a relaxed interpolation for overlapping. The window used in the relaxed interpolation is shown in FIG. 8. A window structure used here may use one of a rectangular window, a linear function, a polynomial function, or a sine function. FIG. 8 illustrates a window using the linear function. Here, when the old window 800 and the next window 820 overlap, a sum of the two window values has to be 1 corresponding to a length of the frame. Referring to FIG. 8, a signal which is output by the relaxed interpolation performing the overlap and add operation on two windows having the same size as the frame is added to a block corresponding to an overlap size OV_SIZE that is to be output. By using the signal with the added block, the overlap and add operation is performed on the next frame 820. On a front part of the signal restored by the interpolation with the old frame 800, the overlap and add operation is performed similarly in the aforementioned operations as shown in FIG. 7.

When it is determined in operation 120 that errors do not exist in the current frame and it is determined in operation 140 that the detected position is provided after the second critical position, an inverse transform is performed to restore a final audio output (operation 155) without concealing the error of the decoded signal in the frequency domain.

Figure 2:
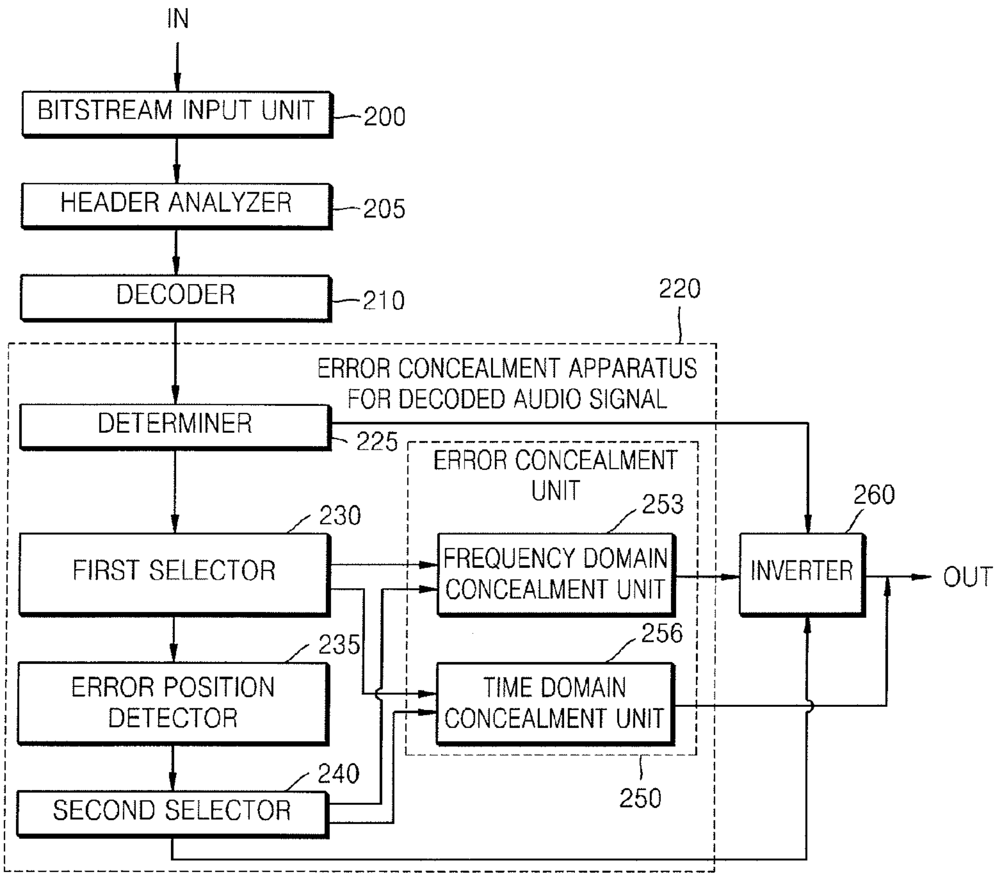
FIG. 2 is a block diagram illustrating an apparatus to decode an audio signal and conceal one or more errors in the decoded audio signal according to an embodiment of the present general inventive concept.

FIG. 2 is a block diagram illustrating an apparatus to decode an audio signal using an error concealment apparatus to conceal one or more error in the decoded audio signal according to an embodiment of the present general inventive concept. The apparatus to decode the audio signal includes a bitstream input unit 200, a header analyzer 205, a decoder 210, an error concealment apparatus 220, and an inverter (or inverse transformer) 260. Referring to FIGS. 1 and 2, the method illustrated in FIG. 2 may be performed in the apparatus illustrated in FIG. 2.

The bitstream input unit 200 receives a bitstream through an input terminal IN from an upper level system such as an MPEG-4 system or an MPEG-TS.

The header analyzer 205 extracts a header from the bitstream received from the bitstream input unit 200 and analyzes information included in the header.

The decoder 210 decodes the bitstream received from the bitstream input unit 200.

The error concealment apparatus 220 conceals errors in the bitstream decoded by the decoder 210. Here, the error concealment apparatus 220 includes a determiner 225, a first selector 230, an error position detector 235, a second selector 240, and an error concealment unit 250.

The determiner 225 determines whether one or more errors exist in a current frame of the bitstream decoded by the decoder 210. The determiner 225 can determine whether the errors exist in the current frame by using the following three methods.

First, whether the errors exist in the current frame is determined by performing a CRC operation using information which is transmitted from the system and shows whether errors exist in a frame.

Second, whether the errors exist in the current frame is determined by comparing a length of a bitstream transmitted from an encoder with a length of the bitstream decoded by the decoder 210. When the errors exist in the frame, a difference occurs between the length of the decoded bitstream and the length of the bitstream transmitted from the encoder. On the other hand, when the errors do not exist in the frame, the length of the bitstream transmitted from the encoder is used for decoding. Therefore, when the length of the bitstream transmitted from the encoder and the length of the decoded bitstream are the same, it is determined that the errors do not exist in the bitstream of the current frame. When the length of the bitstream transmitted from the encoder and the length of the decoded bitstream are different, it is determined that the errors exist in the bitstream of the current frame.

Last, whether the errors exist in the current frame is determined by comparing the number of bits of a unit frame included in a header of the bitstream with the number of bits of the bitstream received from the bitstream input unit 200. For example, in BSAC, frame_length information representing a length of the unit frame provided to the header is compared with the number of bits of the bitstream received from the bitstream input unit 200, and when the comparison result shows that there is a difference between the number of bits of the unit frame and the number of bits of the received bitstream, and that the difference is different from one or more predetermined critical values, it is determined that the errors exist in the current frame.

When the determiner 225 determines that the errors exist in the current frame, the first selector 230 analyzes a state of the current frame and determines whether concealing errors in the frequency domain is difficult (that is, whether the difficulty of concealing the errors in the frequency domain) so as to select one from among an error concealment method in the frequency domain and an error concealment method in the time domain. Whether concealing the errors in the frequency domain in a codec using a bitstream including a plurality of layers such as the BSAC or AAC is difficult can be determined on the basis of a window type. Due to the characteristics of the MDCT, when window types of the previous frame and the current frame are different, and an overlap and add operation is not performed when the errors do not exist, a desired audio signal cannot be generated. Accordingly, the first selector 230 analyzes a state of the current frame and considers a state of the previous frame to determine whether concealing the errors in the frequency domain is difficult. Therefore, when the first selector 230 determines that concealing the errors in the frequency domain for the current frame is difficult, the first selector 230 selects the error concealment method in the time domain, and when the first selector 230 determines that concealing the errors in the frequency domain for the current frame is not difficult, the first selector 230 selects the error concealment method in the frequency domain.

When the first selector 230 selects the error concealment method in the frequency domain, the error position detector 235 detects a position where the errors exist in the current frame. Examples of a method of detecting the position where the errors exist in the current frame performed by the error position detector 235 include the following two methods.

First, the position where the errors exist in the current frame is detected by comparing spectrum energy of the current frame with spectrum energy of the previous frame. When one or more errors exist in a frame, the spectrum energy of the current frame significantly changes as compared with the spectrum energy of the previous frame. For example, FIG. 4A is a graph illustrating the spectrum energy of the previous frame where the errors do not exist, and FIG. 4B is a graph illustrating the spectrum energy of the current frame where the errors exist. When graphs of FIGS. 4A and 4B are compared, it can be determined that the spectrum energy in the frequency domain where the errors exist significantly changes. Here, by using Equation 4 below, the spectrum energy of the current frame and the spectrum energy of the previous frame can be compared with each other.

$$Dt(f)=\text{energy}(f,t)-\text{energy}(f,t-1) \quad \text{[Equation 4]}$$

Here, Dt(f) denotes a change in a spectrum energy of a frame, energy(f, t) denotes the spectrum energy of the current frame, and energy(f, t−1) denotes the spectrum energy of the previous frame.

When Dt(f) deviates from a predetermined range, it is determined that the errors exist at a corresponding position in the current frame.

In addition, the position where the errors exist in the current frame can be detected by comparing spectrum energy of a current frequency domain and spectrum energy of a previous frequency domain. When one or more errors exist in a frame, the spectrum energy in the current frequency domain significantly changes as compared with the spectrum energy in the previous frequency domain. By using the following Equation 5, the spectrum energy in the current frequency domain and the spectrum energy in the previous frequency domain can be compared with each other.

$$Df(f)=\text{energy}(f,t)-\text{energy}(f-1,t) \quad \text{[Equation 5]}$$

Here Df(f) denotes a change in a spectrum energy in the frequency domain, energy(f, t) denotes the spectrum energy in the current frequency domain, and energy(f, t−1) denotes the spectrum energy in the previous frequency domain.

When Df(f) deviates from a predetermined range, it is determined that the errors exist at a corresponding position.

By using the aforementioned method, a layer corresponding to a frequency band in the current frame where the errors occur is deduced.

Second, the position where the errors exist in the current frame is detected by examining bits allocated to each layer of the decoded bitstream. A header of a bitstream constructed with a plurality of layers has information on the number of bits to be allocated to each layer. For example, in the BSAC, a header includes layer_buf_offset that is a help variable and shows the number of bits to be allocated to each layer. When errors exist in a layer, more or less bits are used in the arithmetic decoding. Therefore, a layer using more or less bits may have a possibility that errors exist in the current layer or a previous layer.

The second selector 240 selects one from among the error concealment method in the frequency domain and the error concealment method in the time domain on the basis of the position of errors detected by the error position detector 235.

When the position detected by the error position detector 235 is provided before the first critical position, the second selector 240 may select the error concealment method in the time domain. This is because when the position detected by the error position detector 235 corresponds to data which has an important role in decoding such as a base layer shown in FIG. 3, it is possible to perform concealing errors in the time domain for the entire frame as illustrated in FIGS. 1 and 2. However, the second selector 240 may select the error concealment method in the frequency domain to conceal the errors by using the error concealment method in the frequency domain for the entire frequency domain of the frame.

If the position detected by the error position detector 235 is provided after the second critical position, the second selector 240 does not conceal the errors and output the signal to the inverter 260. This is because when the position detected by the error position detector 235 is in the last layer corresponding to the N-th layer illustrated in FIG. 3, and therefore errors do not substantially affect audio sound quality, the errors need not be concealed.

When the position detected by the error position detector 235 is between the first and second critical positions, the second selector 240 selects the error concealment method in the frequency domain.

The error concealment unit 250 conceals the errors in the current frame. Here, the error concealment unit 250 includes a frequency domain concealment unit 253 and a time domain concealment unit 256.

The frequency domain concealment unit 253 conceals errors in the current frame in the frequency domain. Here, in order to conceal the errors in the current frame, the frequency domain concealment unit 235 may use a repetition method of copying data of the previous frame to replace the current frame having the errors. Data before the position detected by the error position detector 235 remains, and data after the position detected by the error position detector 235 is restored by copying the data of the previous frame as the data after the position. Accordingly, when the bitstream is constructed with a plurality of layers and a frequency band is allocated to each layer such as in the BSAC, although errors occur in the middle of the bitstream, layers before a layer having the errors can be maintained as they are. For example, when the position detected by the error position detector 235 is 8 kHz, a layer corresponding to the 8 kHz and layers after the corresponding layer are restored by copying the layers of previous frames thereto. Accordingly, by using information decoded before the occurrence of errors for a frame having the errors, the audio sound quality can be improved.

The time domain concealment unit 256 conceals errors in the current frame in the time domain.

In order to conceal the errors, the time domain concealment unit 256 ignores information on the current frame and retrieves a segment from a previous frame having the highest similarity to the current frame to restore the current frame by using interpolation and extrapolation. When the MDCT is applied in the encoding and/or decoding processes, and the overlap and add operation has to be performed, two PCM frames are lost. Accordingly, when errors occur in a frame, two frames always have to be restored. Therefore, the time domain concealment unit 256 has to restore not only the current frame but also a next frame by using interpolation or extrapolation. In order to do this, information on previous frames is stored and used to conceal the errors in the current frame. FIG. 5 is a conceptual view for explaining transition using the error concealment method in the time domain. In addition, a synchronous overlap and add operation for restoring two continuous PCM frames may be used.

Referring to FIG. 6, when errors occur in an n-th frame corresponding to the current frame, due to a predetermined overlap window, for example, a 50% overlap window, an (n+1)-th frame corresponding to the next frame is affected. When a previous signal is simply repeatedly used, the previous frame, a first error frame, and a second error frame sequentially generate errors, so that there is a problem in that sound quality significantly deteriorates. In order to solve the problem of generating sequential errors, the WSOLA method and the interpolation may be simultaneously used. The n-th frame corresponding to the first frame may be applied with the WSOLA method, and the (n+1)-th frame corresponding to the second frame may be applied with the frame interpolation.

An embodiment to apply the WSOLA method to the n-th frame corresponding to the first frame is illustrated in FIG. 7. First, an output of a previous time domain of the BSAC is buffered. By using the previous block signal of the current frame generating errors and the following Equation 6 in a previous search range, a correlation is obtained.

[Equation 6]

$$R(d) = \frac{\sum_{k-0}^{K} S(k)S(k-d)}{\sqrt{\sum_{k-0}^{K} S^2(k) \sum_{k-0}^{K} S^2(k-d)}}$$

Here, R(d) denotes the correlation, s(n) denotes an old_buff signal, and d denotes a sample position in the search range.

After obtaining a position of a found block having the highest correlation from among correlations obtained by using Equation 6, the found block and a next signal are copied to a segment generating errors so as to restore the segment. Here, when the copying and restoring are performed, windowing is performed. A segment of the found block on which the overlapping is performed may use one of a linear function, a polynomial function, and a sine function, and a segment of the found block on which the overlapping is not performed may use a rectangular window. In addition, a window having a phase opposite to the window used in the found block is obtained in order for a block segment to overlap and be added to the segment of the found block. Here, the windows are designed so that a sum of the two window values in the overlapped segment is 1. The aforementioned operations are repeatedly performed to the end of the frame. Here, according to the size of the frame, the frame can be divided in units of 1 or more. According to Equation 6, the correlations are obtained in units of a sample. In this case, in consideration of complexity, the correlations can be obtained in units of two or more samples.

In addition, in order to increase precision, around a sample having the highest correlation and in a range of two or more samples, correlations may be additionally obtained in units of a sample to obtain a position of the sample having the highest correlation.

An embodiment to apply the frame interpolation to the (n+1)-th frame corresponding to the second frame is illustrated in FIG. 8. Linear interpolation is applied between an old frame 800 and a next good frame 820. Since a future signal is provided in units of a frame due to a delay problem, for overlapping, a window is modified and applied with relaxed interpolation. The window used in the relaxed interpolation is illustrated in FIG. 8. A window structure used here may use a rectangular window, a linear function, a polynomial function, or a sine function. FIG. 8 illustrated a window using the linear function. Here, when the old window 800 and the next window 820 overlap, a sum of the two window values has to be 1. Referring to FIG. 8, a signal which is output by the relaxed interpolation performing the overlap and add operation on two windows having the same size as the frame is added to a block corresponding to an overlap size OV_SIZE to be output. By using the signal with the added block, the overlap and add operation is performed on the next frame 820. On a front part of the signal restored by the interpolation with the old frame 800, the overlap and add operation is performed similarly in the aforementioned operations as shown in FIG. 7.

The inverter 260 restores a final audio output by performing inverse transformation on the signal to be output through an output terminal OUT.

The error concealment method and apparatus to conceal one or more errors in a decoded audio signal according to the present embodiment selects the frequency domain or the time domain in order to conceal the errors, detects a position where the errors exist in a frame when the error concealment method in the frequency domain is selected, and conceals the errors only in a segment after the detected position.

Accordingly, the errors are adaptively concealed according to the decoded bitstream, so that noises can be effectively removed. In addition, information decoded before the occurrence of errors is used as much as possible for the frame having errors, so that there is an advantage in that audio sound quality can be improved.

The invention can also be embodied as computer readable codes on a computer readable medium. The computer readable medium may include a computer readable recording medium and a computer readable transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network-coupled computer systems so that the computer readable codes is stored and executed in a distributed fashion. The computer readable transmission medium can transmit the computer readable codes as carrier waves or signals, i.e., wired or wireless data transmission through the Internet. Also, functional programs, codes and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An error concealment method of processing a decoded audio signal, the method comprising:

determining whether one or more errors exist in a frame of a decoded bitstream comprising a plurality of layers;

in response to determining that the errors exist in the frame, selecting one of an error concealment method in a frequency domain and an error concealment method in a time domain, based on a characteristic of the frame; and concealing, performed by using at least one processor, the errors according to the selected method, wherein the selecting of an error concealment method comprises detecting a layer location having the one or more errors among the plurality of layers and determining the error concealment method based on the detected layer location.

2. The method of claim 1, wherein the selecting of the one of the error concealment methods comprises: determining whether concealing the errors in the frequency domain for the frame is difficult; and selecting the one of the error concealment method in the frequency domain and the error concealment method in the time domain according to the result of the determining.

3. The method of claim 2, wherein the determining of whether concealing the errors in the frequency domain for the frame is difficult comprises determining on a basis of a window type.

4. The method of claim 2, wherein the selecting of the one error concealment method further comprises: detecting a position where the errors exist in the frame; and selecting the one of the error concealment method in the frequency domain and the error concealment method in the time domain by using the detected position.

5. The method of claim 4, wherein the detecting of the position comprises detecting the position only when the error concealment method in the frequency domain is selected according to the result of the determining.

6. The method of claim 4, wherein the detecting of the position where the errors exist in the frame comprises comparing spectrum energy of the frame and spectrum energy of a previous frame.

7. The method of claim 4, wherein the detecting of the position where the errors exist in the frame comprises comparing spectrum energy of the frequency domain and spectrum energy of a previous frequency domain.

8. The method of claim 4, wherein the detecting of the position where the errors exist comprises detecting a layer of the frame having the error by examining bits allocated to each layer of the decoded bitstream.

9. The method of claim 4, wherein the selecting of the one error concealment method according to the detected position comprises selecting the error concealment method in the time domain when the detected position is provided before a critical position.

10. The method of claim 4, wherein the selecting of the one error concealment method according to the detected position comprises selecting the one error concealment method in the frequency domain when the detected position is included in a predetermined range.

11. The method of claim 4, wherein the selecting of the one error concealment method according to the detected position comprises not concealing the error when the detected position is provided after a critical position.

12. The method of claim 4, wherein the concealing of the error when the error concealment method in the frequency domain is selected comprises restoring a frequency band corresponding to the detected position of the frame with a signal corresponding to a frequency band of a previous frame.

13. The method of claim 4, wherein the concealing of the error when the error concealment method in the frequency domain is selected comprises restoring a layer including the detected position and next layers of the layer with layers of a previous frame.

14. The method of claim 1, wherein the concealing of the errors when the error concealment method in the time domain is selected comprises concealing the errors in the frame and a next frame.

15. The method of claim 14, wherein the concealing of the errors in the frame comprises concealing the errors by a WSOLA (waveform similarity based overlap-add) method, and concealing errors in a next frame by interpolation.

16. The method of claim 1, wherein the determining of whether the errors exist in the frame of the decoded bitstream comprises comparing a length of a transmitted bitstream with a length of the decoded bitstream.

17. An error concealment apparatus to process a decoded audio signal, the apparatus comprising:

an error frame detector to detect a frame having one or more errors in a decoded bitstream comprising a plurality of layers;

a concealment method selector to select one of an error concealment method in a frequency domain and an error concealment method in a time domain for the detected frame, based on a characteristic of the detected frame; and an error concealment unit to conceal the errors according to the selected method, wherein the concealment method selector is configured to detect a layer location having the one or more errors among the plurality of layers and to determine the error concealment method based on the detected layer location.

18. The apparatus of claim 17, wherein the concealment method selector comprises: a determiner to determine whether concealing the errors in the frequency domain for the frame is difficult; and a first selector to select the one of the error concealment method in the frequency domain and the error concealment method in the time domain according to the result of the determining.

19. The apparatus of claim 18, wherein the determiner determines whether concealing the errors in the frequency domain for the frame is difficult on a basis of a window type.

20. The apparatus of claim 18, wherein the concealment method selector further comprises: an error position detector to detect a position where the errors exist in the frame; and a second selector to select the one of the error concealment method in the frequency domain and the error concealment method in the time domain by using the detected position.

21. The apparatus of claim 20, wherein the error position detector detects the position where the errors exist in the frame only when the first selector selects the error concealment method in the frequency domain.

22. The apparatus of claim 20, wherein the error position detector detects the position where the errors exist in the frame by comparing spectrum energy of the frame with spectrum energy of a previous frame.

23. The apparatus of claim 20, wherein the error position detector detects the position where the errors exist in the frame by comparing spectrum energy in the frequency domain with spectrum energy of a previous frequency domain.

24. The apparatus of claim 20, wherein the error position detector detects the position where the errors exist in the frame by examining bits allocated to each layer of the decoded bitstream.

25. The apparatus of claim 20, wherein the second selector selects the error concealment method in the time domain when the detected position is provided before a critical position of the frame.

26. The apparatus of claim 20, wherein the second selector selects the error concealment method in the frequency domain when the detected position is included in a predetermined range.

27. The apparatus of claim 17, wherein the error concealment unit conceals the errors for the frame and a next frame when the error concealment method in the time domain is selected.

28. The apparatus of claim 27, wherein the error concealment method conceals the errors for the frame by using a WSOLA (waveform similarity based overlap-add) method and conceals errors for the next frame by using interpolation.

29. The apparatus of claim 17, wherein the error frame detector detects the frame of the decoded bitstream having the errors by comparing a length of a transmitted bitstream with a length of the decoded bitstream.

30. An error concealment method of processing a decoded audio signal, the method comprising:

selecting one of an error concealment method in a frequency domain and an error concealment method in a time domain for a frame of a decoded bitstream having one or more errors, based on a characteristic of the frame; and concealing, performed by using at least one processor, the errors according to the selected method, and in response to the error concealment method in the time domain being selected, concealing the one or more errors by using interpolation or extrapolation.

31. A non-transitory computer-readable medium having embodied thereon a computer program to execute a method of processing a decoded audio signal, the method comprising:

determining whether one or more errors exist in a frame of a decoded bitstream;

in response to determining that the errors exist in the frame, selecting one of an error concealment method in a frequency domain and an error concealment method in a time domain, based on a characteristic of the frame; and concealing the errors according to the selected method, and if the error concealment method in the time domain is selected, concealing the one or more errors by using interpolation or extrapolation.

32. An error concealment apparatus to process a decoded audio signal, the apparatus comprising:

an error frame detector to detect a frame having one or more errors in a decoded bitstream;

a concealment method selector to select one of an error concealment method in a frequency domain and an error concealment method in a time domain for the detected frame, based on a characteristic of the detected frame; and an error concealment unit to conceal the errors according to the selected method, wherein the error concealment unit conceals the errors by using interpolation or extrapolation when the error concealment method in the time domain is selected.

33. An error concealment apparatus to process a decoded audio signal, the apparatus comprising:

a concealment method selector to select one of an error concealment method in a frequency domain and an error concealment method in a time domain for a frame of a decoded bitstream having one or more errors, based on a characteristic of the frame; and an error concealment unit to conceal the errors according to the selected method, and in response to the error concealment method in the time domain being selected, to conceal the one or more errors by using interpolation or extrapolation.

34. An audio processing apparatus to process an audio signal, comprising:

a decoder to decode a bitstream; and an error concealment apparatus to select one of an error concealment method in a frequency domain and an error concealment method in a time domain for the detected frame when a frame of the decoded bitstream includes one or more errors, based on a characteristic of the frame, to conceal the one or more errors according to the selected error concealment method, and in response to the error concealment method in the time domain being selected, to conceal the one or more errors by using interpolation or extrapolation.

35. An audio processing apparatus to process an audio signal, comprising:

a decoder to decode an audio signal to generate a decoded signal having a plurality of frames; and an error concealment apparatus to select one of an error concealment method in a frequency domain and an error concealment method in a time domain to conceal one or more errors of one of the plurality of frames according to a location within the one frame and an error concealment method in a frequency domain, based on a characteristic of the frame, and in response to the error concealment method in the time domain being selected, to conceal the one or more errors by using interpolation or extrapolation.

36. An audio processing apparatus to process an audio signal, comprising:

a decoder to decode an audio signal to generate a decoded signal having a plurality of frames and a plurality of layers; and an error concealment apparatus to select one of an error concealment method in a frequency domain and an error concealment method in a time domain to conceal one or more errors of one of the plurality of frames based on a characteristic of the frame, and in response to the error concealment method in the time domain being selected, to conceal the one or more errors by using interpolation or extrapolation.

37. An audio processing apparatus to process an audio signal, comprising:

a decoder to decode an audio signal to generate a decoded signal having a plurality of layers; and an error concealment apparatus to selectively conceal one or more errors of decoded signal according to a location of the errors and one of a concealment method in a time domain and a concealment method in a frequency domain; and an inverter to inversely transform the decoded audio signal received from the error concealment apparatus, wherein the error concealment apparatus is configured to detect a layer location having the one or more errors among the plurality of layers and to determine the error concealment method based on the detected layer location.

38. An error concealment apparatus to process an audio signal, comprising:

a decoder to decode an audio signal to generate a decoded signal having a plurality of layers;

an error frame detector to detect a frame having one or more errors in the decoded signal; and a concealment unit to conceal one or more errors of the frame, by using an error concealment method determined according to a characteristic of the frame having the one or more errors in the decoded audio signal so as to, if the error concealment method in the time domain is selected, conceal the one or more errors by using interpolation or extrapolation.

39. An error concealment method to process an audio signal, comprising:

determining an error concealment method according to a characteristic of a frame having one or more errors in an audio signal having a plurality of layers; and concealing, performed by using at least one processor, the one or more errors of the audio signal, by the determined concealment method, wherein the determining of an error concealment method comprises detecting a layer location having the one or more errors among the plurality of layers and determining the error concealment method based on the detected layer location.

40. The apparatus of claim 20, wherein the second selector does not conceal the errors of the decoded bitstream when the detected position is provided after a critical position.

41. The apparatus of claim 20, wherein the error concealment unit restores a frequency band corresponding to the detected position with a signal corresponding to a frequency band of a previous frame when the error concealment method in the frequency domain is selected.

42. The apparatus of claim 20, wherein the error concealment unit restores a layer corresponding to the detected position and next layers with layers of a previous frame when the error concealment method in the frequency domain is selected.

43. An error concealment method of processing a decoded audio signal, the method comprising:

determining whether one or more errors exist in a frame of a decoded bitstream;

in response to determining that the errors exist in the frame, selecting one of an error concealment method in a frequency domain and an error concealment method in a time domain, based on a characteristic of the frame; and concealing, performed by using at least one processor, the errors according to the selected method, wherein the concealing of the error when the error concealment method in the time domain is selected comprises concealing the errors by using interpolation or extrapolation.

* * * * *